June 21, 1949.                G. S. WICKIZER ET AL              2,473,627
                          THERMOCOUPLE WITH RADIATING FINS
                                Filed Sept. 21, 1944

INVENTOR.
G.S. WICKIZER AND E.N. BROWN
BY
H.S. Grover
ATTORNEY

Patented June 21, 1949

2,473,627

UNITED STATES PATENT OFFICE 2,473,627

THERMOCOUPLE WITH RADIATING FINS

Gilbert S. Wickizer and Ernest N. Brown, Riverhead, N. Y., assignors to Radio Corporation of America, a corporation of Delaware Application September 21, 1944, Serial No. 555,092

3 Claims. (Cl. 136—4)

This invention relates to a new and useful thermoelectric differential thermometer and more particularly to the method and devices for obtaining the direct measurement of the difference between ground and air temperature.

An object of this invention is to provide an improved thermoelectric system for ascertaining temperature differences.

Another object of this invention is to provide a simple and efficient differential temperature determination thermocouple device with large radiating surfaces of several square inches in extent, for good heat conduction, which will be easy to manufacture and simple to calibrate.

A feature of this invention is the novel electrical circuit arrangement of a pair of thermocouple units of the type disclosed by this invention for determining the polarity of the difference between the ground and air temperature and is accomplished by burying in the ground a thermocouple unit at a depth of about 6 inches and also locating a similar thermocouple unit about 4 feet above the surface of the ground.

This invention is based on the thermoelectric properties of certain dissimilar metals when in contact at different temperatures. The electrical voltage thus generated varies directly with the difference in temperature over a small range, thereby simplifying the calibration of the device. One thermocouple unit or thermojunction is suspended in the air and properly shielded from the sun but still freely exposed to the circulating air. The other unit is buried in the ground at a depth depending on the desired result. The devices are then connected in an electrical circuit. A temperature difference between the two thermojunction units will generate in the circuit a small electrical voltage which may be read on a sensitive meter. A great number of thermojunction units may be employed when greater sensitivity is desired.

In the past the measurement of the difference between the air and ground temperatures was normally obtained by measuring the air and ground temperatures separately; subtraction of one reading from the other was necessary to find the difference. According to this invention the measurement of the difference between the air and ground temperatures will readily be obtained by direct reading from a sensitive properly calibrated meter.

The difference between air and ground temperature is of valuable interest in the field of meteorology. The exchange of heat between air and ground has a tendency to modify the characteristics of the air mass, the amount depending on a number of factors. The difference between air and ground temperatures is also related to vertical stability; with the warmer ground, there is heating and consequent rising of the air, while with the colder ground, there is cooling and a retarding effect on vertical motion. The latter condition is quite likely to result in a decreasing dielectric constant gradient near the ground. Such a gradient is in the direction to produce bending of the paths of very high radio frequency waves toward the earth, with resulting greater signal strength and distance.

This invention will best be understood by referring to the accompanying drawing in which.

Figure 1:
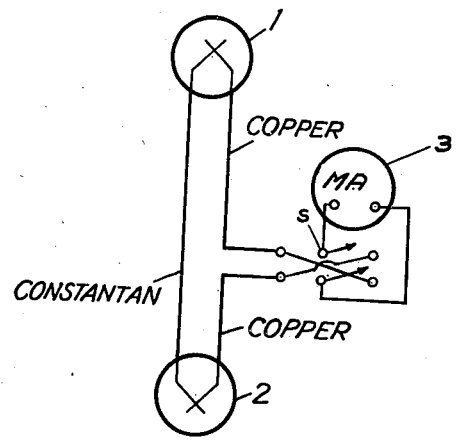
Fig. 1 is a circuit diagram of the system of this invention.

Referring now in detail to Fig. 1 of the drawing, a thermocouple unit 1 is electrically connected to a second thermocouple unit 2, the thermocouple units both being connected in series with a microammeter 3. A polarity reversing switch S is connected between the thermocouple circuit and the micro-ammeter 3. The thermocouple unit 1 is suspended about 4 feet in the air and the thermocouple unit 2 is buried below the surface of the ground to a depth of about 6 inches. The two thermocouple units must not be spaced too far apart because of circuit resistance.

Figure 3:
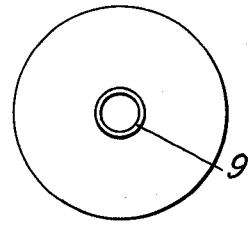
Fig. 3 is a top view of Fig. 2.
Figure 2:
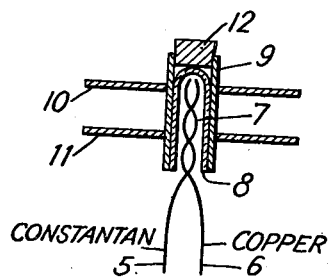
Fig. 2 is a cross sectional view of a thermocouple device of this invention.

The thermocouple units 1 and 2 are constructed as shown in Figs. 2 and 3 of the drawing and are composed of two wires of dissimilar metal such as for example a constantan wire 5 and a copper wire 6. A portion of each wire is twisted together at 7 to form the thermojunction. An insulating tube member 8 which is preferably of quartz (although glass or other good insulators may be used) is arranged to surround the twisted portion 7 of the wires. A metallic tube 9 surrounds the insulating member 8 and a pair of large circular radiating fins 10 and 11 are soldered to member 9 so as to provide greater thermo conductivity therewith. A brass cap 12 is provided for enclosing the top portion of tube 9. This arrangement provides a large radiation surface for good heat conduction.

Figure 4:
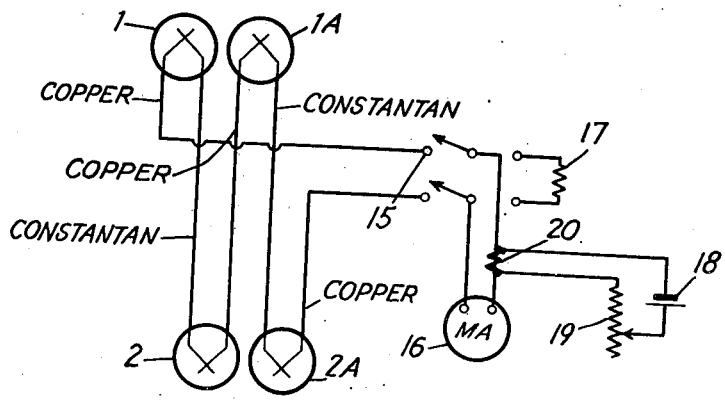
Fig. 4 is a circuit diagram of another system of this invention.

The circuit diagram shown by Fig. 4 of the drawing includes a plurality of thermocouple units 1 and 1A which are connected together in series with thermocouple units 2 and 2A. It is desirable to keep the electrical resistance of the circuit at a low value, so that the small voltage generated by the thermocouples will be delivered to the indicating meter, rather than dissipated throughout the circuit. Accordingly, the two units must not be spaced too far apart as they are all connected in series, with the thermo-junctions selected alternately from each unit. It will be noted that there are as many wires connecting the two units together as there are thermojunctions. In this circuit arrangement the 2 copper wire leads are connected to a double pole double throw switch 15. The centers of hinged terminals of switch 15 are connected to an indicating device, such as a galvanometer, millivoltmeter or recording microammeter 16. A dummy load in the form of a low resistance 17 which matches the resistance of the thermocouple circuit is connected to the opposite side of the switch. The recording microammeter may be used as an indicator, as well as for making a permanent record. A multi-channel recorder is desirable so that one channel by connection to the dummy load 17 may be used to trace a zero line. A separate bias voltage 18 is connected to a variable resistance 19 and resistance 20, the resistance 20 being connected in series with one of the center terminal blades of switch 15 and the meter 16. With the circuit arrangement of a separate bias voltage connected in series with the meter, a zero-center meter which will read either plus or minus from a mid-scale value is obtained. The zero or mid-scale value represents no difference between air and ground temperatures.

The sensitivity of the device may be increased by increasing the number of thermocouples in each unit as already mentioned. The resistance of the meter should be somewhat greater than the resistance of the thermocouple circuit to derive the advantage of added thermojunctions.

The use to which this device may be put is not limited to differences in temperature. Knowing either the air or ground temperature, the temperature of the other may be found through a knowledge of the difference. For example, from the air temperature and the difference, the ground temperature may be obtained. This is of practical importance in predicting icy travelling conditions due to rain falling on roads which are below freezing temperature.

In the operation of the system of this invention a difference in temperature reading between the two units 1 and 2 will generate a small electrical voltage which will deflect the meter 3 in the circuit. The meter may be calibrated to give the desired temperature reading directly. In an arrangement such as that shown by Fig. 1, the reversing switch S is necessary between the thermocouple circuit and the meter since the air may be either warmer or colder than the ground temperature and, hence, either terminal of the thermocouple leads may become positive. The electrical polarity of the voltage indicates on meter 3 which of these conditions is present. In the arrangement shown by Fig. 4 a reversing switch is unnecessary because the introduction of the bias has transformed the meter into a zero-center instrument.

While we have described a system and device for carrying the invention in effect it will be apparent to one skilled in the art that our invention is by no means limited to the particular device shown and described, but that many modifications may be made without departing from the scope of the invention.

What we claim is:

1. A thermocouple device comprising a copper wire, a constantan wire, a portion of both of said wires being twisted together, an insulating member surrounding the twisted portion of said wires and a metallic circular radiation element surrounding said insulating member, said metallic circular radiation element including a plurality of spaced radiating vanes surrounding said insulating member.

2. A thermocouple device comprising a copper wire, a constantan wire, a portion of both of said wires being twisted together, an insulating member surrounding the twisted portion of said wires, a tubular metallic member surrounding said insulating member, a metal cap closing one end of said metallic tube, and a pair of circular spaced radiating fins secured in thermal contact with said metallic tube to provide greater thermal conductivity therewith.

3. A thermocouple device comprising a temperature responsive electric element composed of two wires of dissimilar metal twisted together, an insulating tubular member surrounding the twisted portion of said wires, said insulating tubular member being closed at one end, the other end being provided with metallic leads for connecting the twisted portion of said wires, a metallic member surrounding said insulating tubular member, and a plurality of spaced radiating fins secured in thermal contact with said metallic member to provide greater thermal conductivity therewith.

GILBERT S. WICKIZER.
ERNEST N. BROWN.

REFERENCES CITED

The following references are of record in the file of this patent:

UNITED STATES PATENTS

| Number | Name | Date |
|---|---|---|
| 721,770 | Zeleny | Mar. 3, 1903 |
| 1,025,715 | Peake | May 7, 1912 |
| 1,103,640 | Wilson | July 14, 1914 |
| 1,552,284 | Evins | Sept. 1, 1925 |
| 1,643,582 | Martin | Sept. 27, 1927 |
| 1,721,556 | Harrison | July 23, 1929 |
| 1,775,682 | Martin | Sept. 16, 1930 |
| 2,012,465 | Godecke | Aug. 27, 1935 |
| 2,304,489 | Wetzel | Dec. 8, 1942 |

FOREIGN PATENTS

| Number | Country | Date |
|---|---|---|
| 320,194 | Great Britain | 1929 |
| 571,801 | France | May 23, 1924 |

OTHER REFERENCES

Foote et al., B. S. Technologic Paper #79 (1921), page 21.

Taylor, G. F., J. Ind. & Eng. Chem., vol. 12 (1920), page 797.